United States Patent Office 3,682,828
Patented Aug. 8, 1972

3,682,828
SILICA GEL-CONTAINING MAGNESIA
INSULATING COMPOSITION
Heinrich Keddeinis, Ranzel, Arnold Lenz, Cologne-Stammhein, Otto Bleh, Bergheim, Sieg, and Erich Termin, Niederkassel, Germany, assignors to Dynamit Nobel Aktiengesellschaft, Troisdorf, Germany
No Drawing. Filed June 22, 1970, Ser. No. 48,554
Int. Cl. H01b 3/10, 7/00; H05b 3/60
U.S. Cl. 252—63.2
3 Claims

ABSTRACT OF THE DISCLOSURE

An electrical insulating material consists essentially of:
(1) a sintered magnesia of at least 94 weight percent purity, and
(2) 0.1 to 7 weight percent of a silica gel having a specific surface area in the range of 50 to 1100 m.$^2$/g., and a size less than 370$\mu$, preferably less than 70$\mu$.

This insulating material is particularly useful in the manufacture of tubular heating coils and insulators.

PREAMBLE

Fused or sintered granulated magnesium oxide has been used as an electrical insulating material, for example as the filling of heating elements and in the manufacture of insulators. The chemical composition of the magnesia varies within the following limits:

| | Weight percent |
|---|---|
| MgO | 94–98 |
| SiO$_2$ | 1.0–3.5 |
| CaO | 0.5–2.0 |
| Al$_2$O$_3$ | 0.02–0.25 |
| Fe$_2$O$_3$ | 0.01–0.10 |
| NiO | 0.01–0.03 |
| SO$_3$ | 0.005–0 |
| Cl | 0.005–0 |
| B$_2$O$_3$ | 0.005–0 |
| TiO$_2$ | 0.005–0 |
| Na$_2$O | 0.003–0.02 |
| K$_2$O | 0.001–0.003 |

The commercial granulated mixtures do not differ appreciably in their grain size distribution. The electrical resistance of the insulating materials prepared from them, however, is quite variable. This is particularly apparent when the material is exposed to temperatures exceeding about 800° C. to 900° C. The reasons for this are not entirely clear. The measured leakage currents, which are inversely proportional to the resistances, vary, for example, between about 6 ma. and about 40 ma. at a specific surface loading of 10 watts per square centimeter, even though the chemical composition be similar.

THIS INVENTION

The present invention is a process for the manufacture of an insulating material of high electrical resistance from granulated fused or sintered magnesium oxide having a purity of better than 94 weight percent, which process is characterized by the fact that 0.1 to 7 percent, preferably 1 to 5 percent by weight, of silica gel of high specific surface area and a grain size under 370$\mu$, preferably under 70$\mu$, is mixed with the granulated material before it is made by conventional processes into the insulating material.

The term "insulating material" is here intended to mean filling material for electrical heating elements or molded ceramic insulators.

The surface area of the silica gel added is preferably to 50 to 1100 square meters per gram. Such a material is described, for example, in Römpp's "Chemie-Lexikon," 6th ed., on pp. 83, 3243 and 5915.

By the process of the invention a considerable improvement in the electrical resistance is achieved, which is particularly surprising since it has hitherto been thought that the addition of SiO$_2$ greatly increased the conductivity of MgO. See Gmelin, Handbuch der Anorganischen Chemie, "Magnesium" (Teil B), System No. 27, p. 45.

EXAMPLES

The grain size distribution of the fused or sintered granular electrical magnesia mixtures was:

| | Weight percent |
|---|---|
| 0.25–0.36 mm. | 30 |
| 0.12–0.25 mm. | 45 |
| 0.07–0.12 mm. | 15 |
| 0.044–0.07 mm. | 10 |

The magnesia used had the following compositions (weight percent):

| | 96% pure | 97% pure |
|---|---|---|
| MgO | 95.8 | 97.2 |
| SiO$_2$ | 1.54 | 1.59 |
| Al$_2$O$_3$ | 0.02 | 0.04 |
| Fe$_2$O$_3$ | 0.34 | 0.030 |
| CaO | 2.31 | 1.05 |
| NiO | 0.026 | 0.014 |
| B$_2$O$_3$ | 0.005 | 0.005 |
| SO$_3$ | 0.005 | 0.005 |
| Cl | 0.005 | 0.005 |
| TiO$_2$ | 0.005 | 0.005 |
| Na$_2$O | 0.005 | 0.005 |
| K$_2$O | 0.005 | 0.005 |

The measurement of the leakage currents, which are inversely proportional to the resistances, was performed in high-grade steel tubes of the same kind as is used in the electrical manufacturing industry. The tubes had the following dimensions:

| | Mm. |
|---|---|
| Length | 500 |
| Diameter (prior to compression) | 10 |
| Wall thickness | 0.75 |

After filling, the tubes were reduced to a diameter of 8.2 mm. The heating coils had a diameter of 3 mm. and a wire size of 0.3 mm. The test voltage between the heating coil and the tube material amounted to 500 v. The alternating current supply had a voltage of 220 v.

EXAMPLE 1

Electrically fused MgO containing 97% MgO

Leakage currents in ma. at a specific surface loading of:

| | 5 w. | 6 w. | 7 w. | 8 w. | 9 w. | 10 w. |
|---|---|---|---|---|---|---|
| Without silica gel | 0.28 | 0.64 | 1.56 | 4.10 | 9.20 | 24.20 |
| With 1 wt. percent silica gel A | 0.17 | 0.28 | 0.50 | 0.86 | 1.92 | 4.60 |

EXAMPLE 2

Electrically fused MgO containing 97% MgO

Leaking currents in ma. at specific surface loading of:

| | 5 w. | 6 w. | 7 w. | 8 w. | 9 w. | 10 w. |
|---|---|---|---|---|---|---|
| Without silica gel | 0.28 | 0.64 | 1.56 | 4.10 | 9.20 | 24.20 |
| With 5 wt. percent silica gel A | 0.29 | 0.45 | 0.78 | 1.13 | 1.68 | 3.40 |

EXAMPLE 3

Sintered magnesium oxide for ceramic purposes (96% MgO)

Leakage currents in ma. at a specific surface loading of:

|  | 5 w. | 6 w. | 7 w. | 8 w. | 9 w. | 10 w. |
|---|---|---|---|---|---|---|
| Without silica gel | 7.30 | 8.30 | 8.90 | 10.60 | 14.70 | 19.70 |
| With 2.3 wt. percent silica gel A | 3.80 | 4.0 | 4.0 | 3.80 | 4.40 | 5.40 |

EXAMPLE 4

Electrically fused MgO containing 97% MgO

Leakage currents in ma. at a specific surface loading of:

|  | 5 w. | 6 w. | 7 w. | 8 w. | 9 w. | 10 w. |
|---|---|---|---|---|---|---|
| Without silica gel | 0.28 | 0.64 | 1.56 | 4.10 | 9.20 | 24.20 |
| With 1 wt. percent silica gel B | 0.18 | 0.35 | 0.80 | 1.98 | 5.80 | 12.60 |

Silica gel A had a grain size of 20–200 m$\mu$, an average grain size of 100 m$\mu$ and a specific surface area of 660 m.$^2$/g. Silica gel B is sold under the trademark "Aerosil" and has a grain size of 20 m$\mu$ and a specific surface area of 200 m.$^2$/g.

We claim:

1. An electrical insulating material comprising fused or sintered magnesium oxide having a purity of greater than 94 weight percent intimately admixed within the range of 0.1 to 7 weight percent of a silica gel having a surface area in the range of about 50 to 1100 m.$^2$/g. and a grain size under 370$\mu$.

2. The insulating material of claim 1 wherein said magnesium oxide and silica gel amount to essentially 100 percent of said composition and wherein said surface area is in the range of 50 to 1100 m.$^2$/g. and said grain size is under 70$\mu$.

3. In the preparation of an electrical heating element comprising a resistance wire in a tubular jacket with insulation therebetween consisting essentially of a sintered magnesia of at least 94 weight percent purity, the improvement comprising admixing with said magnesia prior to incorporation into said heating element in the range of 0.1 to 7 weight percent of a silica gel having a surface area in the range of about 50 to 1100 m.$^2$/g. and a particle size of less than 370$\mu$.

References Cited

UNITED STATES PATENTS

| 2,669,636 | 2/1954 | Rawles | 252—63.2 |
| 2,347,733 | 5/1944 | Christensen | 106—287 |
| 2,285,952 | 6/1942 | Vogel et al. | 252—63.2 X |
| 2,768,264 | 10/1956 | Jones et al. | 252—63.2 X |
| 3,477,058 | 11/1969 | Vedder et al. | 338—238 |

ROBERT F. BURNETT, Primary Examiner

R. A. DAWSON, Assistant Examiner

U.S. Cl. X.R.

174—118; 219—553; 252—63.5; 338—238